(12) United States Patent
Hirai

(10) Patent No.: US 7,692,708 B2
(45) Date of Patent: Apr. 6, 2010

(54) PHOTOMETRIC APPARATUS

(75) Inventor: Isamu Hirai, Tokyo (JP)

(73) Assignee: Hoya Corporation, Tokyo (JP)

( * ) Notice: Subject to any disclaimer, the term of this patent is extended or adjusted under 35 U.S.C. 154(b) by 1037 days.

(21) Appl. No.: 11/331,178

(22) Filed: Jan. 13, 2006

(65) Prior Publication Data

US 2006/0158530 A1    Jul. 20, 2006

(30) Foreign Application Priority Data

Jan. 17, 2005    (JP) ............................. 2005-009183

(51) Int. Cl.
*H04N 5/225* (2006.01)
(52) U.S. Cl. ...................... 348/335; 348/345
(58) Field of Classification Search .............. 348/222.1, 348/345, 335, 339; 396/51, 294
See application file for complete search history.

(56) References Cited

U.S. PATENT DOCUMENTS

| | | | |
|---|---|---|---|
| 4,586,786 A | | 5/1986 | Suzuki et al. |
| 4,745,426 A | * | 5/1988 | Suda et al. ................... 396/112 |
| 5,760,834 A | * | 6/1998 | Rostoker ..................... 348/340 |
| 6,014,525 A | * | 1/2000 | Ohkura et al. ............... 396/234 |
| 6,112,029 A | * | 8/2000 | Suda ........................... 396/92 |
| 6,222,622 B1 | | 4/2001 | Hirai et al. |
| 6,229,602 B1 | | 5/2001 | Hirai et al. |
| 6,507,709 B2 | * | 1/2003 | Hirai et al. ................... 396/225 |
| 6,639,626 B1 | * | 10/2003 | Kubo et al. ................... 348/218.1 |
| 6,806,971 B2 | * | 10/2004 | Finarov ....................... 356/636 |
| 2003/0030822 A1 | * | 2/2003 | Finarov ....................... 356/636 |
| 2004/0150878 A1 | * | 8/2004 | Omura ........................ 359/356 |
| 2005/0068454 A1 | * | 3/2005 | Afsenius .................... 348/345 |

FOREIGN PATENT DOCUMENTS

| | | |
|---|---|---|
| JP | 57-133441 | 8/1982 |
| JP | 58-122502 | 7/1983 |
| JP | 1-138622 | 5/1989 |
| JP | 11-133477 | 5/1999 |
| JP | 2002-139763 | 5/2002 |

OTHER PUBLICATIONS

English Language Abstract 11-133477.

* cited by examiner

*Primary Examiner*—Tuan Ho
(74) *Attorney, Agent, or Firm*—Greenblum & Bernstein, P.L.C.

(57) ABSTRACT

A photometric apparatus having at least two photo-receivers, includes a single incidence optical system, wherein a light bundle carrying an object image which is passed through a focusing screen and exits out of an image-erecting system is incident on the single incidence optical system; a beam splitting optical system which splits the incident light bundle, that is incident on the single incidence optical system, into at least two light bundles by making a part of the incident light bundle pass through the beam splitting optical system and making another part of the incident light reflect from the beam splitting optical system; and at least one photometering optical system which makes the two parts of the light incident on the two photo-receivers, respectively.

16 Claims, 4 Drawing Sheets

PHOTOMETRIC APPARATUS

BACKGROUND OF THE INVENTION

1. Field of the Invention

The present invention relates to a photometric apparatus including a plurality of photometric sensors.

2. Description of the Prior Art

In a photometric apparatus of an single-lens reflex camera, a photometric sensor is disposed on the exit surface side of a viewfinder optical system, e.g., in the vicinity of the exit surface of a pentagonal prism, to measure the brightness of an object image on a focusing screen by re-forming the same object image on a light receiving surface of the photometric sensor. Additionally, a split photometric sensor in which a light receiving surface thereof is divided into a plurality of photometric areas to measure the brightness of an object image incident on each of these photometric areas is known in the art. In this split photometric sensor, the plurality of photometric areas are isolated from one another by an insensitive area on the light receiving surface, and accordingly, the brightness of an object image incident on the insensitive area does not contribute to the photometric measurement of the split photometric sensor.

Accordingly, the assignee of the present invention has proposed a photometric apparatus including a pair of split photometric sensors, wherein each of the pair of split photometric sensors includes a plurality of split sensing areas and an insensitive area, and wherein portions of the object image which are formed on the insensitive area of one of the pair of split photometric sensors are formed on the plurality of spit sensing areas of the other split photometric sensor. This photometric apparatus is disclosed in Japanese Unexamined Patent Publication H11-133477.

Since this photometric apparatus has two different photometric optical systems for the pair of split photometric sensors, the volume necessary for accommodating these elements is great, and accordingly, there are many factors of error due to the existence of more than one photometric optical system. Specifically, errors or fluctuations easily occur in the output characteristics peculiar to full-aperture photometering respect to the f-number because more than one incidence optical system exits. Because of the existence of more than one photometric optical system, it is necessary for each photometric optical system to set an optimum correction factor for correcting error during full-aperture photometering, which causes an increase in memory capacity for storing software of a controller dealing with these optimum correction factors and complicates the examination of the correction factor settings. Moreover, if the plurality of photometric optical systems are made independently of each other on the grounds that it is difficult for the plurality of photometric optical systems to be made as a single unit, the number of manufacturing steps is increased.

SUMMARY OF THE INVENTION

The present invention provides a photometric apparatus which is small in volume, has stable photometering output characteristics and is easily formable as a unit.

According to an aspect of the present invention, a photometric apparatus having at least two photo-receivers is provided, including a single incidence optical system, wherein a light bundle carrying an object image which is passed through a focusing screen and exits out of an image-erecting system is incident on the single incidence optical system; a beam splitting optical system which splits the incident light bundle, that is incident on the single incidence optical system, into at least two light bundles by making a part of the incident light bundle pass through the beam splitting optical system and making another part of the incident light reflect from the beam splitting optical system; and at least one photometering optical system which makes the two parts of the light incident on the two photo-receivers, respectively.

It is desirable for the photometering optical system to include at least two photometering optical systems, wherein the single incidence optical system and the two photometering optical systems are configured to serve as an optical system via which an object image formed on the focusing screen is projected onto each of the two photo-receivers. Magnifications of the two photometering optical systems are determined so that the sizes of object images projected onto the two photo-receivers different from each other.

It is desirable for the two photo-receivers to include split photometric sensors having the same shape and size, wherein each of the split photometric sensors operates to measure a brightness of different areas thereon.

It is desirable for the photometering optical system to include at least two photometering optical systems, wherein the single incidence optical system and the two photometering optical systems are configured to serves as an optical system via which an object image formed on the focusing screen is projected onto each of the two photo-receivers. Magnifications of the two photometering optical systems are the same as each other so that the sizes of the object images projected onto the two photo-receivers are identical with each other.

It is desirable for each of the two photo-receivers to include a split photometric sensor which operates to measure brightness of object images formed on split sensing areas of the split photometric sensor. An insensitive area of one of the two split photometric sensors, which isolates the split sensing areas from one another, is formed to be substantially the same in shape and size to one of the split sensing areas of the other of the two split photometric sensors.

It is desirable for the beam splitting optical system to include a beam splitter, wherein the single incidence optical system is provided as a lens, at least a part of which is formed integral with an incident end surface of the beam splitter, and the photometering optical system is provided as a lens, at least a part of which is formed integral with an exit surface of the beam splitter.

It is desirable for the beam splitting optical system to include a beam splitting surface which splits the incident light bundle into the at least two light bundles in one of horizontal, vertical and another direction, so that the area ratio of at least one reflecting surface of the beam splitting surface to at least one transmitting surface of the beam splitting surface is a predetermined ratio.

It is desirable for the beam splitting optical system to include a beam splitting surface which splits the incident light bundle into the at least two light bundles in one of horizontal, vertical and another direction, so that the ratio of an amount of light reflection of at least one reflecting surface of the beam splitting surface to an amount of light transmission of at least one transmitting surface of the beam splitting surface is a predetermined ratio.

It is desirable for the predetermined ratio to be substantially one to one.

It is desirable for the beam splitting surface to include a pinhole mirror including a large number of pinholes formed on the beam splitting surface.

It is desirable for the beam splitting surface to include a half mirror.

It is desirable for centers of the two light bundles which are incident on a beam splitting surface of the splitting optical system to be determined to be at a substantially same distance and angle from an optical axis of a photographing lens.

It is desirable for the image-erecting system to include one of a pentagonal prism and a hollow pentagonal mirror. The light bundle carrying an object image exits out of an upper part of an exit surface of the one of the pentagonal prism and the hollow pentagonal mirror to be incident on the single incidence optical system.

It is desirable for the photometric apparatus to be incorporated in a single-lens reflex camera.

It is desirable for the single incidence optical system, the beam splitting optical system and the photometering system to be formed as a single optical unit.

In an embodiment, a photometric apparatus incorporated in a single lens reflex camera is provided, including a beam splitter which is positioned behind an exit surface of an image-erecting system of the single lens reflex camera and which splits an incident light bundle into at least two light bundles by transmitting a part of the incident light bundle through the beam splitter and reflecting another part of the incident light bundle by the beam splitter; at least two photo-receivers positioned adjacent to the beam splitter; a first lens formed integral with an incident surface of the beam splitter on which the incident light is incident; a second lens formed integral with a first exit surface of the beam splitter to make one of the two light bundles incident on one of the two photo-receivers; and a third lens formed integral with a second exit surface of the beam splitter to make the other of the two light bundles incident on the other of the two photo-receivers.

It is desirable for the image-erecting system to include one of a pentagonal prism and a hollow pentagonal mirror.

According to the present invention, characteristics of error during full-aperture photometering of the plurality of photometric optical systems become substantially identical with one another to thereby reduce or eliminate a photometering compensation for each photometric optical system.

Moreover, the plurality of photometric optical systems can be easily made as a single unit, and accordingly, the photometric apparatus can be easily assembled and adjusted.

Furthermore, since the photometric apparatus devised according to the present invention can be easily made as a single unit, the volume necessary for accommodating the elements of the photometric apparatus can be reduced by making the photometric apparatus as a single unit.

The present disclosure relates to subject matter contained in Japanese Patent Application No. 2005-009183 (filed on Jan. 17, 2005) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENTS

Figure 1:
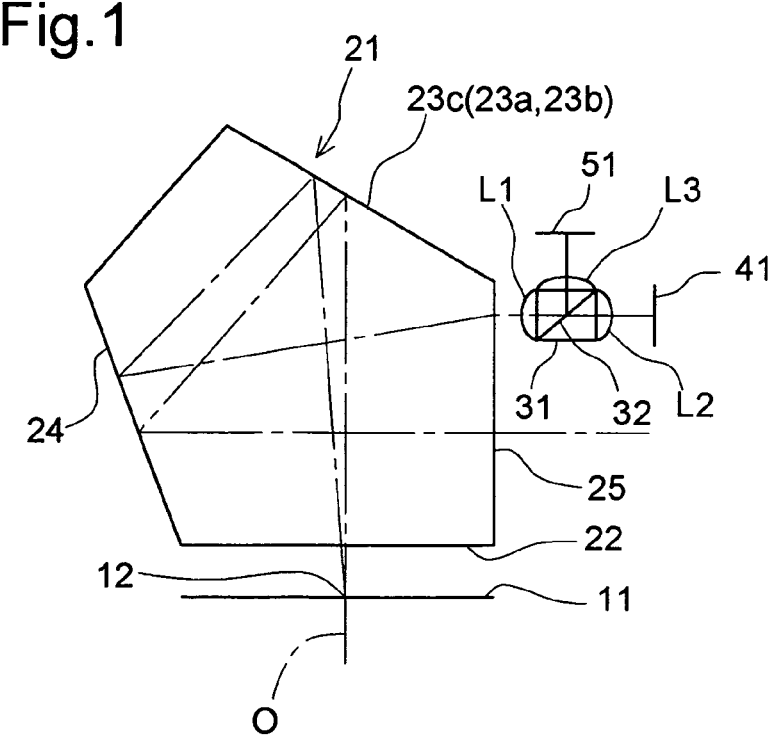
FIG. 1 is a side elevational view of elements of an embodiment of a single-lens reflex camera including a pentagonal prism, according to the present invention.

Although not shown in detail in the drawings, a light bundle carrying an object image which is incident on a quick-return mirror (not shown) through a photographing lens (not shown) and is reflected by the quick-return mirror is incident on a focusing screen 11 (see FIGS. 1 and 2) to be formed as an object image thereon. Subsequently, the light which forms the object image on the focusing screen 11 passes through the focusing screen 11 and is incident on an incident end surface 22 of a pentagonal prism (image-erecting optical system) 21. Subsequently, this incident light is reflected by roof surfaces 23a and 23b of the pentagonal prism 21 or a ridge 23c therebetween, and is further reflected by a third reflecting surface 24 of the pentagonal prism 21 to exit therefrom through an exit surface 25. An eyepiece[TM1], (not shown) is positioned in the vicinity of the exit surface 25 so that the photographer views an object image focused on the focusing screen 11 through the eyepiece.

A part of the light which is passed through the focusing screen 11 exits out of a portion of the periphery of the exit surface 25 to proceed toward a point outside the eyepiece. In the illustrated embodiment, a photometric apparatus including a pair of split photometric sensors (photo-receivers) 41 and 51 is installed at a position at which object light (i.e., light carrying the object image) emerging from a portion of the exit surface 25 in the vicinity of the upper end thereof is incident. The illustrated embodiment of the photometric apparatus is provided with an incidence lens L1, a beam splitter 31, a first image-forming lens L2 and a second image-forming lens L3. The incidence lens L1 is provided as a single incidence optical system. The beam splitter 31 serves as a light-splitter optical system which splits the incident object light converged by the incidence lens L1 therethrough to form a plurality of exit optical systems. The first image-forming lens L2 projects the incident object light, which is incident on a beam splitting surface 32 of the beam splitter 31 and passed therethrough to be incident on the first image-forming lens L2, onto a light receiving surface of the first split photometric sensor 41 to form an object image thereon. The second image-forming lens L3 projects the incident object light, which is reflected by the beam splitting surface 32 to be incident on the second image-forming lens L3, onto a light receiving surface of the second split photometric sensor 51 to form an object image thereon.

A substantially half of the object light which is passed through the focusing screen 11 and is incident on the beam splitter 31 passes through the beam splitting surface 32 to be projected onto the first split photometric sensor 41 via the first image-forming lens L2, and the remaining half of the object light is reflected by the beam splitting surface 32 to be projected onto the second split photometric sensor 51 via the second image-forming lens L3. A light path of a light ray which exits from the focusing screen 11 at a center thereof (i.e., at a point on the focusing screen 11 which intersects an optical axis O) to be incident on the incidence lens L1 through the pentagonal prism 21 is shown in FIG. 1.

A part or the entirety of the incidence lens L1 can be formed integral with an incident surface of the beam splitter 31, and a part or the entirety of each of the first and second image-forming lenses L2 and L3 can be formed integral with an exit surface of the beam splitter 31. Such integral formation of the lenses (L1, L2 and L3) reduces the number of manufacturing steps and the number of elements of the photometric apparatus. Moreover, if the incidence lens L1, the first image-forming lens L2, the second image-forming lens L3, the beam splitter 31, the first split photometric sensor 41 and the second split photometric sensor 51 are made as a single unit, installation and adjustment of these elements can be easily carried out.

Although the second split photometric sensor 51 is installed above the beam splitter 31 on the precondition that the direction of reflection by the beam splitting surface 32 of the beam splitter 31 is an upward direction, in the present embodiment of the photometric apparatus, it is possible for the beam splitting surface 32 of the beam splitter 31 to be positioned so as to reflect the incident light either leftward or rightward and for the second split photometric sensor 51 be positioned on either the left side or the right side of the beam splitter 31, respectively, in an alternative embodiment (not shown). This configuration creates some space above the pentagonal prism 21, thus making it possible to reduce the height of the single-lens reflex camera in the area where the beam splitter 31 is provided.

Figure 2:
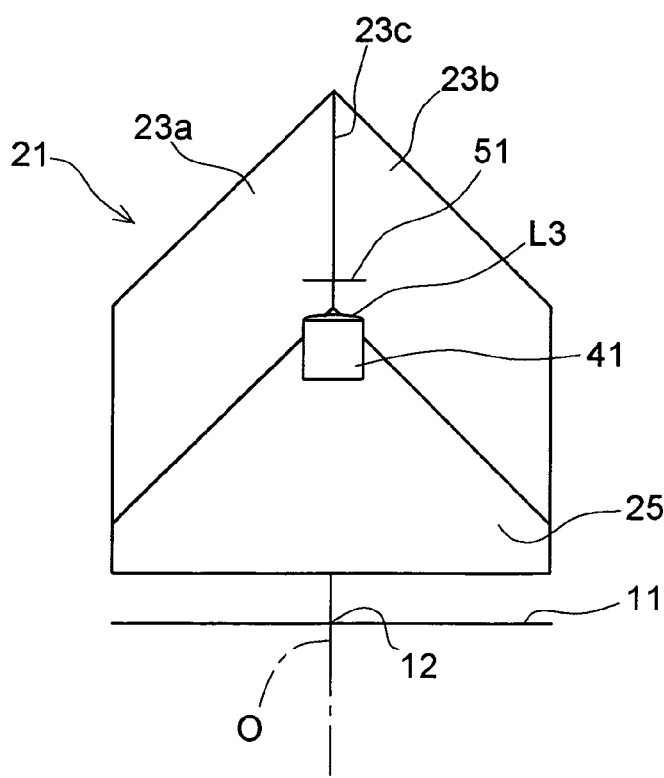
FIG. 2 is a rear elevational view of the elements shown in FIG. 1, viewed from the exit surface side of the pentagonal prism.

Although the beam splitter 31 is adopted as a beam splitting optical system in the illustrated embodiment shown in FIGS. 1 and 2, another optical system which includes a beam splitting surface corresponding to the beam splitting surface 32, such as aplane-parallel plate including a beam splitting surface, can be adopted as the beam splitting optical system in an alternative embodiment (not shown), because the beam splitting optical system only needs to include a beam splitting surface which functions exactly like the beam splitting surface 32.

Figure 3A:
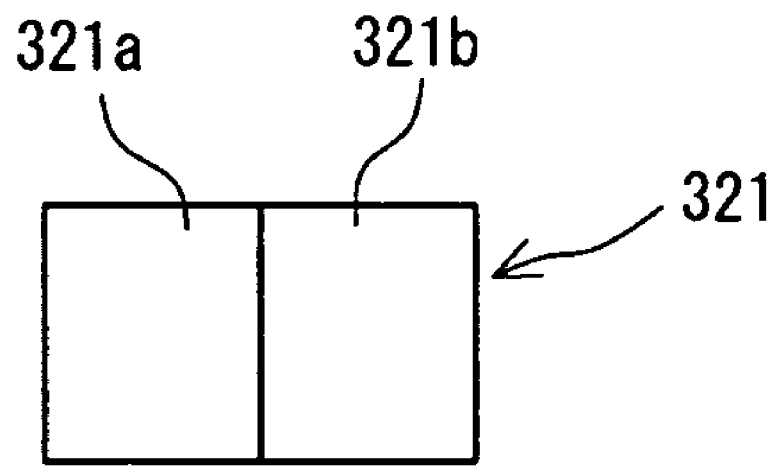
FIG. 3A shows an embodiment of a beam splitting surface of a beam splitting prism shown in FIG. 1, wherein the beam splitting surface is divided into a transmitting surface and a reflecting surface.
Figure 3B:
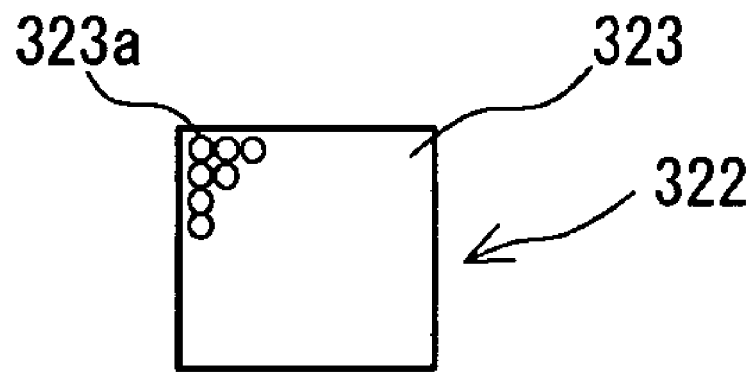
FIG. 3B shows another embodiment of the beam splitting surface of the beam splitting prism shown in FIG. 1, wherein the beam splitting surface is provided thereon with a large number of pinholes.

The beam splitting surface 32 is formed as a conventional half mirror in one embodiment thereof, and in alternative embodiments, the beam splitting surface 32 is formed as an area beam splitting surface 321 and a pinhole beam splitting surface 323 as shown in FIGS. 3A and 3B, respectively. A half of the area beam splitting surface 321 is formed as a transmitting surface 321a and the other half of the area beam splitting surface 321 is formed as a reflecting surface 321b. The pinhole beam splitting surface 323 is provided with a beam splitting surface which is split into two parts: a large number of reflecting portions and a large number of transmitting portions, i.e., a beam splitting surface 322 including a large number of pin holes 323a.

In the area beam splitting surface 321 shown in FIG. 3A, the object light which is passed through the transmitting surface 321a is incident on the first split photometric sensor 41 while the object light which is reflected by the reflecting surface 321b is incident on the second split photometric sensor 51.

Although the beam splitting surface 321 is divided into two laterally equal parts (right and left parts) in the illustrated embodiment shown in FIG. 3A, an alternative embodiment of the beam splitting surface which is divided into two vertically equal parts, and an alternative embodiment of the beam splitting surface which includes reflecting surfaces and transmitting surfaces which are alternately arranged in either strips or a reticular pattern can be provided. In each of these alternative embodiments, the area ratio of the reflecting surfaces to the transmitting surfaces only needs to be set at substantially one to one (1:1), the ratio of the amount of light reflection of the reflecting surfaces to the amount of light transmission of the transmitting surfaces only needs to be set at substantially one to one (1:1), or the reflectivity of the reflecting surfaces and the transmittance of the transmitting surfaces only need to be set to be substantially the same as each other.

In the area beam splitting surface 321, it is desirable for the centers of the incident light bundles which are incident on the transmitting surface and the reflecting surface, respectively, to be determined as to be at a substantially same distance (angle) from the optical axis O (finder optical axis), i.e., are symmetrically with respect to the optical axis O.

In the pinhole beam splitting surface 322 shown in FIG. 3B, the amount of light which passes through the pinholes 323a and the amount of light which is reflected by mirror portions (the aforementioned large number of reflecting portions) become substantially identical to each other, the object light which is passed through the pinholes 323a of the pinhole mirror 323 is incident on the first split photometric sensor 41, and the object light which is passed through the mirror portions of the pinhole mirror 323 is incident on the second split photometric sensor 51.

In the beam splitter 31, the incidence lens L1 and the first and second image-forming lenses L2 and L3 can be formed separately, or a part of these optical elements 31, L1, L2 and L3 or all these optical elements 31, L1, L2 and L3 can be integrally formed as one body.

Figure 4:
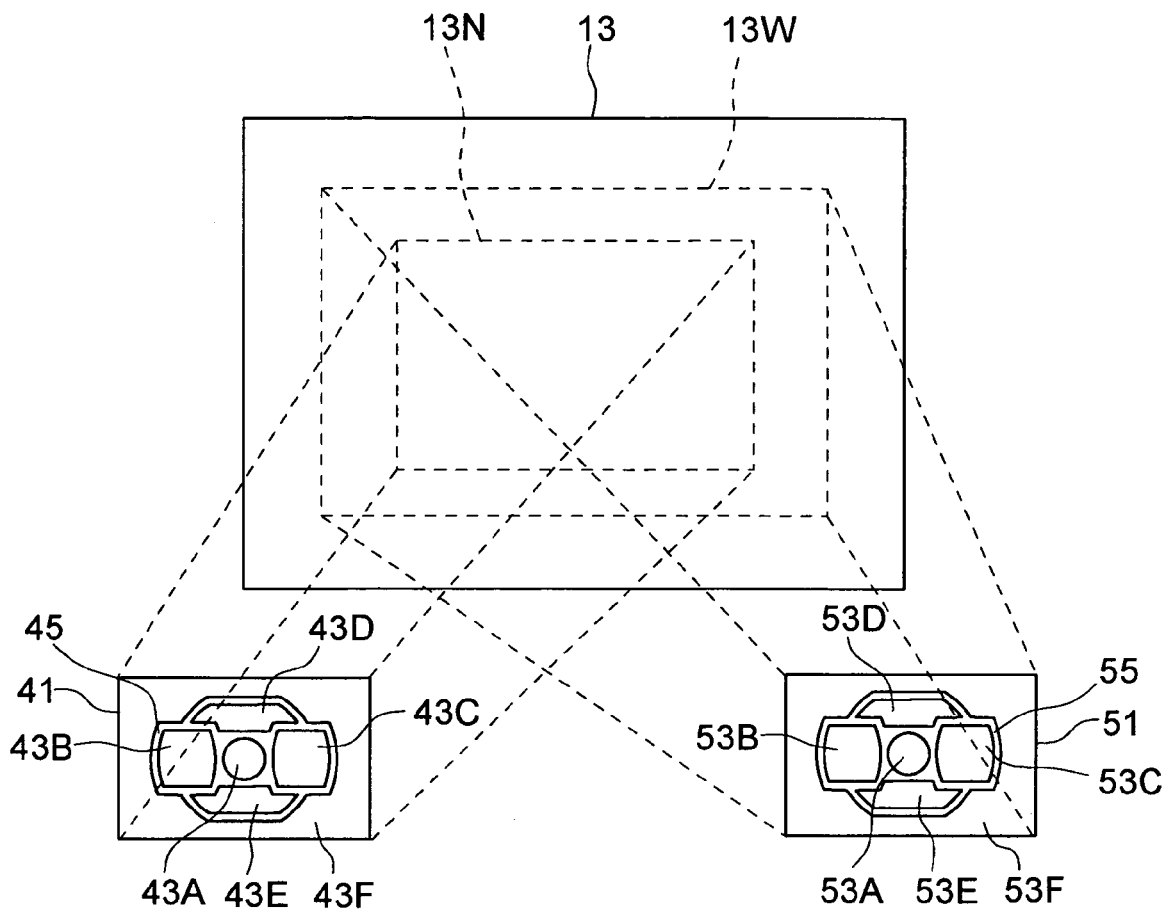
FIG. 4 is a diagram illustrating a relationship between the viewfinder field of view (picture plane) of the embodiment of the single-lens reflex camera shown in FIG. 1 and split sensing areas of first and second split photometric sensors.

FIG. 4 shows a relationship between a field of view (picture plane) 13 of the viewfinder of the camera and light receiving surfaces of the first and second split photometric sensors 41 and 51. In the embodiment illustrated in FIG. 4, the split photometric sensors 41 and 51 are identical and have the same split sensing area pattern. The light receiving surfaces of the split photometric sensors 41 and 51 are each provided with six split sensing areas which are separated by an insensitive area. Specifically, the first split photometric sensor 41 is composed of a central sensing area 43A, a pair of right and left sensing areas 43B and 43C on opposite sides of the central sensing area 43A, a pair of upper and lower sensing areas 43D and 43E on opposite sides of the central sensing area 43A, a peripheral sensing area 43F, and an insensitive area 45 which separates the sensing areas 43A through 43F. The second split photometric sensor 51 has the same structure as the first split photometric sensor 41; namely, the second split photometric sensor 51 is composed of split sensing areas 53A through 53F and an insensitive area 55, identical in shape and size to the sensing areas 43A through 43F and the insensitive area 45, respectively.

Among the object images formed on the split photometric sensors 41 and 51, the brightness of the object images formed on the split detection areas 43A through 43F and 53A through 53F can be measured, however the brightness of the object images formed on the insensitive areas 45 and 55 cannot be measured. In view of this problem, in the illustrated embodiment, the portions of the object images the brightness of which cannot be measured are made as small as possible by making the magnification (focal length) of the first image-forming lens L2 different from the magnification (focal length) of the second image-forming lens L3.

FIG. 4 shows a relationship between the field of view (picture plane) 13 of the viewfinder of the present embodiment of the single-lens reflex camera and small and large sensing areas 13N and 13W of first and second split photometric sensors 41 and 51. As can be clearly understood from FIG. 5, the object image within the relatively small sensing area 13N of the field of view 13 is formed on the first photometric sensor 41, and the object image within the sensing area 13W which is larger than the sensing area 13N is formed on the second photometric sensor 51. The large sensing area 13W is projected onto the second photometric sensor 51 at a magnification less than that of the sensing area 13N projected onto the first photometric sensor 41. Namely, the object images are formed on the first photometric sensor 41 and the second photometric sensor 51 at a high magnification and a low magnification, respectively.

Figure 5:
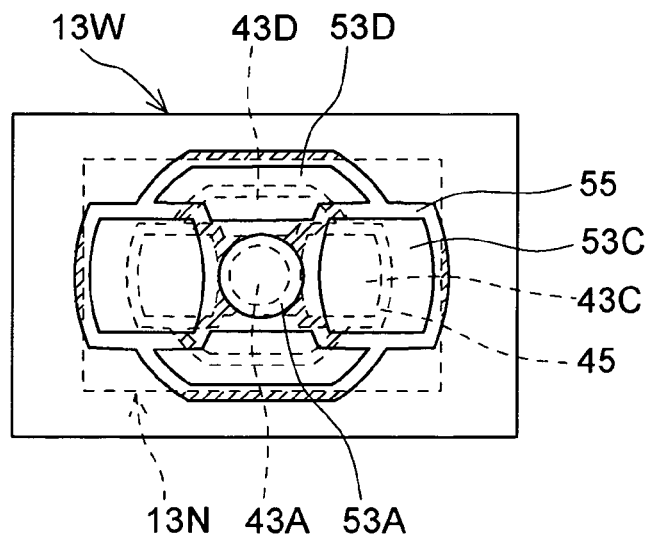
FIG. 5 is a diagram illustrating a relationship between small and large sensing areas and the split sensing areas of the first and second split photometric sensors in the same embodiment of the single-lens reflex camera shown in FIG. 1.

FIG. 5 shows a relationship between the small and large sensing areas 13N, 13W and the split sensing areas 43A through 43F and 53A through 53F of the first and second split photometric sensors 41 and 51. The magnification of the object images formed on the split photometric sensors 41 and 51 are modified in accordance with the ratio of the size of the images on the field of view 13. As can be seen from FIG. 5, a large part of the insensitive area 45 of the second split photometric sensor 41, by which the brightness of object images cannot be measured, is covered (overlapped) by the split sensing areas 53A through 53F of the first split photometric sensor 51. Likewise, a large part of the insensitive area 55 of the first split photometric sensor 51, by which the brightness of object images cannot be measured, is covered (overlapped) by the split sensing areas 53A through 53F of the second split photometric sensor 51. Thus, the insensitive portions which cannot be detected or measured by either the first split photometric sensor 41 or the second split photometric sensor 51 are only those hatched in FIG. 5.

Since the object light incident on the first and second split photometric sensors 41 and 51 are incident thereon through the single incidence lens L1 in the present embodiment of the photometric apparatus, the angle of incidence of the light ray which passes through the focusing screen 11 at a point on the optical axis O to be incident on the first split photometric sensor 41 is identical to that on the second split photometric sensor 51, and characteristics of the first split photometric sensor 41 such as error which occurs during full-aperture photometering of a photometering system are identical to those of the second split photometric sensor 51.

In the embodiment shown in FIGS. 4 and 5, it possible to use two split photometric sensors of the same type via a configuration which determines the magnification of the photometering optical system for one of the two split photometric sensors 41 and 51 to be different from that of the other split photometric sensor. Another embodiment will be discussed with reference further to FIGS. 6A, 6B, 7A and 7B in which the magnifications of the photometering optical systems for the two split photometric sensors are identical to each other by making the two split photometric sensors different from each other.

Figure 6A:
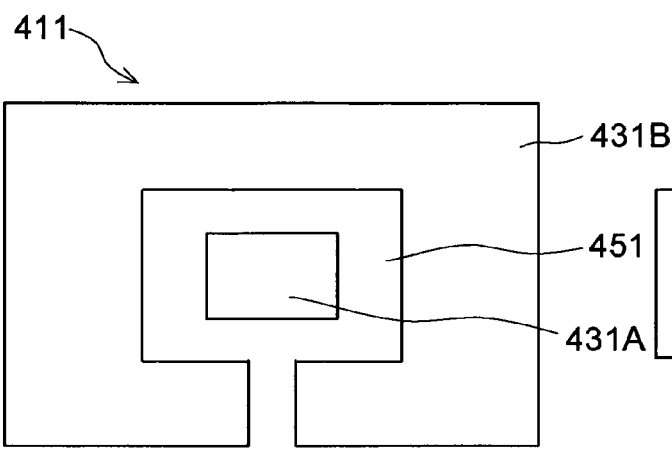
FIG. 6A is a schematic view of a first embodiment of two split sensing areas and one insensitive area of the first split photometric sensor.
Figure 6B:
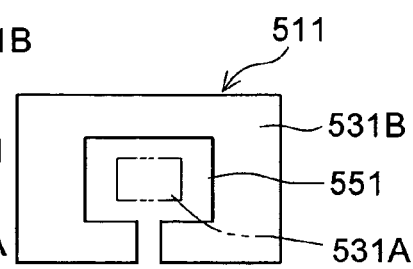
FIG. 6B is a schematic view of a first embodiment of two split sensing areas and one insensitive area of the second split photometric sensor.

Each of first and second split photometric sensors 411 and 511 shown in FIGS. 6A and 6B, respectively, is a two-zone photometric sensor. The first split photometric sensor 411 is provided with a central sensing area 431A and a peripheral sensing area 431B which surrounds the central sensing area 431A. The central sensing area 431A and the peripheral sensing area 431B are isolated by an insensitive area 451. Similarly, the second split photometric sensor 511 is provided with a central sensing area 531A and a peripheral sensing area 531B which surrounds the central sensing area 531A. The central sensing area 531A and the peripheral sensing area 531B are isolated by an insensitive area 551.

In the first and second split photometric sensors 411 and 511, an insensitive area 451 of the first split photometric sensor 411 is formed to have substantially the same shape and size as the peripheral sensing area 531B of the second split photometric sensor 511. According to the embodiment shown in FIGS. 6A and 6B, the brightness of portions of the object images which are incident on the insensitive area 451 of the first split photometric sensor 411 can be measured by the peripheral sensing area 531B of the second split photometric sensor 511.

Figure 7A:
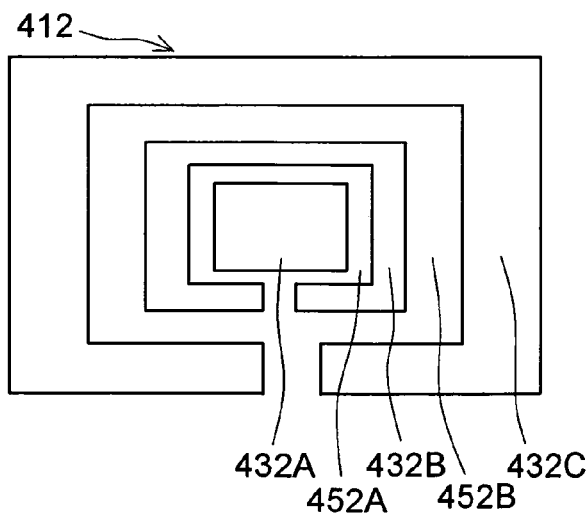
FIG. 7A is a schematic view of a second embodiment of two split sensing areas and one insensitive area of the first split photometric sensor.
Figure 7B:
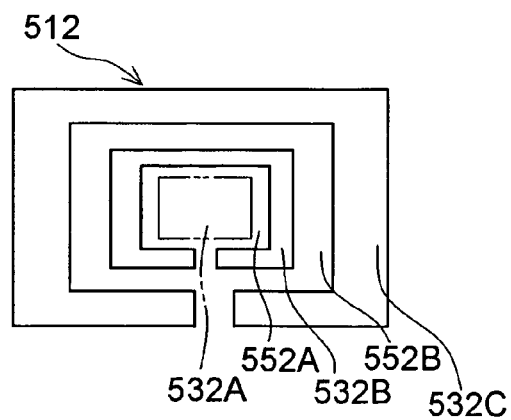
FIG. 7B is a schematic view of a second embodiment of two split sensing areas and one insensitive area of the second split photometric sensor.

Each of first and second split photometric sensors 412 and 512 shown in FIGS. 7A and 7B is a three-zone photometric sensor. The first split photometric sensor 412 is provided with a central sensing area 432A, an intermediate sensing area 432B which surrounds the central sensing area 432A, and a peripheral sensing area 432C which surrounds the intermediate sensing area 432B. The central sensing area 432A and the intermediate sensing area 432B are isolated by an insensitive area 452A while the intermediate sensing area 432B and the peripheral sensing area 432C are isolated by an insensitive area 452B. Similarly, the second split photometric sensor 512 is provided with a central sensing area 532A, an intermediate sensing area 532B which surrounds the central sensing area 532A, and a peripheral sensing area 532C which surrounds the intermediate sensing area 532B. The central sensing area 532A and the intermediate sensing area 532B are isolated by an insensitive area 552A while the intermediate sensing area 532B and the peripheral sensing area 532C are isolated by an insensitive area 552B.

In the first and second split photometric sensors 412 and 512, an insensitive area 452A of the first split photometric sensor 412 is formed to have substantially the same shape and size as the intermediate sensing area 532B of the second split photometric sensor 512, and an insensitive area 452B of the first split photometric sensor 412 is formed to have substantially the same shape and size as the peripheral sensing area 532C of the second split photometric sensor 512. According to this embodiment shown in FIGS. 7A and 7B, the brightness of portions of the object images which are incident on the insensitive areas 452A and 452B of the first split photometric sensor 412 can be measured by the intermediate sensing area 532B and the peripheral sensing area 532C of the second split photometric sensor 512, respectively.

As can be understood from the above description, according to each of the embodiments shown in FIGS. 6A, 6B, 7A and 7B, the first and second split photometric sensors 411 and 511, and the first and second split photometric sensors 412 and 512, can receive almost all the object light within the sensing areas 13N and 13W by some of the split sensing areas without making the magnifications of image by the first and second image-forming lenses L2 and L3 different from each other. In the second split photometric sensors 511 and 512, since the shape (perimeter) of the insensitive areas 551 and 552A are congruent with (have substantially the same size and shape as) the central sensing areas 431A and 432A of the first split photometric sensors 411 and 412, respectively, the first and second split photometric sensors 411 and 511 and the first and second split photometric sensors 412 and 512 can receive almost all the object light within the sensing areas 13N and 13W by some of the split sensing areas even if the central sensing areas 531A and 532A are made as insensitive areas.

Moreover, even in the embodiments shown in FIGS. 6A, 6B, 7A and 7B, since the object light incident on the first and second split photometric sensors 411 and 511 and the first and second split photometric sensors 412 and 512 are incident thereon through the single incidence lens L1, the angle of incidence of the light ray which comes from a point of intersection between the focusing screen 11 and the optical axis O to be incident on the first split photometric sensor 411 (412) is identical to that incident on the second split photometric sensor 511 (512), and characteristics of the first split photometric sensor 411 (412), such as error during full-aperture photometering of a photometering system, are substantially identical to those of the second split photometric sensor 511 (512).

Although the present invention is applied to a single-lens reflex camera which includes a pentagonal prism serving as an image-erecting system in the above illustrated embodiment, the present invention can also be applied to another type of single-lens reflex camera including a hollow pentagonal mirror or a trapezoidal prism.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A photometric apparatus having at least two photometric sensors, comprising:
    a single incidence optical system, on which a light bundle forming an object image, which has passed through a focusing screen and an image erecting system, is incident;
    a beam splitting optical system which splits said light bundle which is incident on said single incidence optical system, into at least two light bundles, said beam splitting optical system comprising an incident surface, a beam splitting surface, a first emitting surface from which a light bundle passing through the beam splitting surface is emitted, and a second emitting surface from which a light bundle reflected by the beam splitting surface is emitted;
    a first photometering optical system provided on the first emitting surface which directs the light bundle emitted from the first emitting surface to a first photometric sensor; and
    a second photometering optical system provided on the second emitting surface which directs the light bundle emitted from the second emitting surface to a second photometering sensor,
    wherein said single incidence optical system and said first and second photometering optical systems are configured to serve as an optical system via which the object image is projected onto the first and second photometric sensors,
    magnifications of said first and second photometering optical systems are the same as each other so that the sizes of object images projected onto said first and second photometric sensors are identical with each other,
    each of said first and second photometric sensors comprises a split photometric sensor which operates to measure brightness of object images formed on split sensing areas of said split photometric sensor, and
    an insensitive area of one of said two split photometric sensors, which isolates said split sensing areas from one another, is formed to be substantially the same in shape and size as one of said split sensing areas of the other of said two split photometric sensors.

2. The photometric apparatus according to claim 1, wherein said single incidence optical system is provided as a lens, at least a part of which is formed integral with the incident surface of said beam splitting optical system, and
    each of said first and second photometering optical systems are provided as a lens.

3. The photometric apparatus according to claim 1, wherein said beam splitting surface splits said light bundle which is incident on said single incidence optical system into said at least two light bundles in one of a horizontal, a vertical and another direction, so that an area ratio of at least one reflecting surface of said beam splitting surface to at least one transmitting surface of said beam splitting surface is a predetermined ratio.

4. The photometric apparatus according to claim 1, wherein said beam splitting surface splits said light bundle which is incident on said single incidence optical system into said at least two light bundles in one of a horizontal, a vertical and another direction, so that a ratio of an amount of light reflection of at least one reflecting surface of said beam splitting surface to an amount of light transmission of at least one transmitting surface of said beam splitting surface is a predetermined ratio.

5. The photometric apparatus according to claim 3, wherein said predetermined ratio is substantially one to one.

6. The photometric apparatus according to claim 4, wherein said predetermined ratio is substantially one to one.

7. The photometric apparatus according to claim 3, wherein said beam splitting surface comprises a pinhole mirror including a large number of pinholes formed on said beam splitting surface.

8. The photometric apparatus according to claim 4, wherein said beam splitting surface comprises a pinhole mirror including a large number of pinholes formed on said beam splitting surface.

9. The photometric apparatus according to claim 3, wherein said beam splitting surface comprises a half mirror.

10. The photometric apparatus according to claim 4, wherein said beam splitting surface comprises a half mirror.

11. The photometric apparatus according to claim 1, wherein light which is incident on the beam splitting surface of said beam splitting optical system and light which is incident on the incident surface of the beam splitting optical system are symmetrical with respect to an optical axis of a photographing lens.

12. The photometric apparatus according to claim 1, wherein said image-erecting system comprises one of a pentagonal prism and a hollow pentagonal mirror, and
    said light bundle forming an object image exits out of an upper part of an exit surface of said one of said pentagonal prism and said hollow pentagonal mirror to be incident on said single incidence optical system.

13. The photometric apparatus according to claim 1, wherein said photometric apparatus is incorporated in a single-lens reflex camera.

14. The photometric apparatus according to claim 1, wherein said single incidence optical system, said beam splitting optical system and said photometering system are formed as a single optical unit.

15. A photometric apparatus incorporated in a single lens reflex camera, comprising:

a beam splitter which is positioned behind an exit surface of an image-erecting system of said single lens reflex camera and which splits an incident light bundle into at least two light bundles by transmitting a part of said incident light bundle through said beam splitter and reflecting another part of said incident light bundle by said beam splitter;

two photometric sensors positioned adjacent to said beam splitter;

a first lens formed integral with an incident surface of said beam splitter on which said incident light is incident;

a second lens formed integral with a first exit surface of said beam splitter to make one of said two light bundles incident on one of said two photometric sensors; and a third lens formed integral with a second exit surface of said beam splitter to make the other of said two light bundles incident on the other of said two photometric sensors, wherein each of said two photometric sensors comprises a split photometric sensor which operates to measure brightness of object images formed on split sensing areas of said split photometric sensor, and an insensitive area of one of said two split photometric sensors, which isolates said split sensing areas from one another, is formed to be substantially the same in shape and size as one of said split sensing areas of the other of said two split photometric sensors.

16. The photometric apparatus according to claim 15, wherein said image-erecting system comprises one of a pentagonal prism and a hollow pentagonal mirror.

* * * * *